United States Patent Office 3,520,859
Patented July 21, 1970

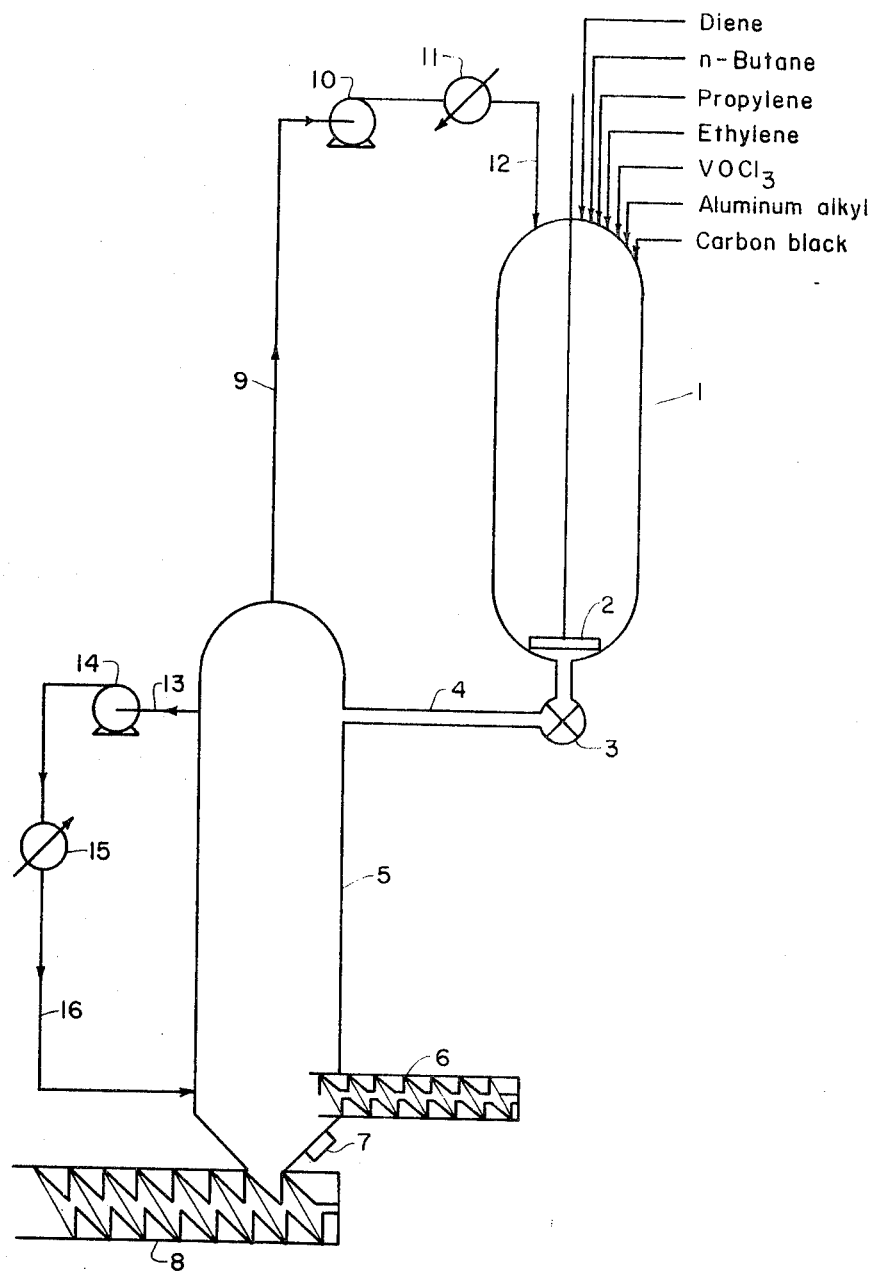

3,520,859
SUSPENSION POLYMERIZATION METHOD FOR PREPARING ELASTOMERIC HYDROCARBON INTERPOLYMERS
Albert E. Schrage, Orange, and Jules E. Schoenberg, Bergenfield, N.J., assignors to Dart Industries Inc., Los Angeles, Calif., a corporation of Delaware
Filed Dec. 9, 1965, Ser. No. 521,236
Int. Cl. C08f 15/40
U.S. Cl. 260—80.78                          4 Claims

ABSTRACT OF THE DISCLOSURE

A process for preparing elastomeric hydrocarbon interpolymers in particle form in a diluent system containing 15 to 99 volume percent of one liquid aliphatic hydrocarbon and at least one other liquid hydrocarbon.

This invention relates to a suspension polymerization method for preparing linear synthetic elastomeric interpolymers. The invention relates more specifically to an improvement in a method for preparing linear synthetic elastomeric interpolymers by the employment of a transition metal compound activated with an organometallic reducing agent wherein the interpolymer is formed in discrete or substantially discrete particle form in a novel suspension polymerization medium.

In the commercial manufacture of linear synthetic elastomeric products from two or more olefinically unsaturated hydrocarbons, it is known to employ as a diluent a normally liquid hydrocarbon such as hexane or heptane and to interpolymerize the olefinically unsaturated monomers while employing as catalysts transition metal halides such as vanadium or titanium compounds activated with trialkylaluminum compounds or alkylaluminum halides and hydrides. Conversion of the olefinic monomers to the interpolymer product in this type of process is usually limited to from 5 to 10% total solids due to the formation of a highly viscous phase which is referred to in the art as a rubber cement. The high viscosity of the rubber cement poses certain problems in this technique for preparing synthetic elastomers due to difficulty in agitating it and the poor heat transfer properties thereof. A low total solids conversion is required, therefore, to keep the viscosity low enough for easy handling and such conversions, therefore, affect porduction rate and costs of manufacture.

In the above described commercial methods for manufacturing linear synthetic elastomers, the interpolymerization reactions are carried out at temperatures below 45° C., usually below 20° C. and frequently at temperatures of about 0° C. or below, since some of the more active vanadium catalysts have a longer life at such temperatures. At these polymerization temperatures, therefore, refrigeration is required and this obviously increases the cost of investment. Low polymerization temperatures are also required in some polymerization processes in order to prevent interaction between the catalyst and certain chlorinated diluents which have also been described as useful in the literature.

The recovery of the rubber cement formed in the foregoing manufacturing process usually involves a costly and difficult polymer coagulation step and a concomitant purification step for recovery of the diluent.

In apparent attempts to overcome some of the difficulties inherent in those processes indicated above, the literature indicates that prior art workers have prepared elastomeric linear interpolymers in suspension form, for example, by using one of the monomers as the diluent in liquid form. Such a technique for preparing an ethylene-propylene rubber is described in British Pat. 898,261. In that patent, the preparation of an ethylene-propylene copolymer elastomer is described carrying out the polymerization employing propylene in the liquid phase at preferred polymerization temperatures of from $-10°$ to $-100°$ C. The employment of liquid propylene as the sole diluent in the preparation of an ethylene-propylene rubber, however, in addition to the low temperatures reported as preferred, has been found to result in heavy reactor fouling, that is, adhesion of insoluble polymer to reactor surfaces, as illustrated in Example 2 of the instant specification.

The literature further indicates that a normally saturated hydrocarbon such as butane (see U.S. Pat. 2,977,349) can be employed as a diluent medium. However, the patent also indicates that the polymerization requires temperatures as low as $-20°$ C. for isoprene and long reaction times such as 89 hours to achieve a conversion of over 80%.

An object of this invention is to provide an improved process for the manufacture of linear elastomeric interpolymers in a suspension to form discrete rubbery particles.

A further object of this invention is to prepare linear synthetic elastomeric interpolymers in a novel diluent system, which system enables the manufacture of such interpolymers in discrete particle form. A specific object of this invention is the manufacture of ethylene-propylene rubbers, and terpolymers of ethylene-propylene and a third monomer containing multiple unsaturation whereby the disadvantages of the prior methods of preparing these copolymers and interpolymers is substantially eliminated. By the term monomers or hydrocarbon monomers containing multiple unsaturation it is intended to mean those monomers which are used to impart olefinic unsaturation to elastomeric interpolymers such as ethylene-propylene terpolymers.

Accordingly, an improvement is provided herein in a process for preparing a linear synthetic elastomeric interpolymer wherein at least one alpha-olefin monomer of the formula $CH_2=CHR$ is interpolymerized with at least one other unsaturated hydrocarbon monomer in the presence of a transition metal compound and an organometallic reducing agent as a catalyst, the said improvement comprising conducting said interpolymerization in a diluent system comprising (a) at least one aliphatic hydrocarbon of from 3 to 5 carbon atoms in liquid form in an amount of from 15 to 99 volume percent and (b) at least one hydrocarbon in liquid form, said hydrocarbon being selected from the group consisting of an alpha-olefin monomer having a boiling point between $-48°$ to $35°$ C., an aliphatic hydrocarbon of from 3 to 5 carbon atoms different from that of (a) and mixtures thereof, in a corresponding amount of from 85 to 1 volume percent of the total liquid diluent system therein, and recovering from said interpolymerization said elastomeric interpolymer in discrete particle form.

The invention further provides a simplified process scheme for carrying out an interpolymerization reaction to form linear synthetic elastomers of two components or of three or more components such as one wherein the third component contains terminal carbon to carbon unsaturation with the novel diluent system herein where a polymerization zone is maintained at pressures above a separation zone and a suspension slurry of discrete elastomeric interpolymers formed in the reaction zone is withdrawn to said separation zone and the diluent system, by virtue of the lower pressure in said zone, is flashed from said elastomer to thereby provide for the recovery of particle form elastomer in a manner heretofore known only in non-elastomeric resin manufacture.

The attached drawing, which forms a part of this invention, illustrates a simplified process flow diagram of apparatus for the process of this invention, particularly with reference to the production of an ethylene-propylene terpolymer.

In the drawing, 1 indicates a stirred reactor capable of withstanding operating pressures up to 1,000 p.s.i.g. or higher. Various lines are shown on the upper portion of this reactor which can be used for the introduction respectively of a hydrocarbon monomer containing multiple unsaturation, n-butane, isobutane, propylene, ethylene, a catalyst such as $VOCl_3$ and an aluminum alkyl, as well as a line for the introduction of carbon black, if desired. The introduction of carbon black to the reaction system permits the preparation of a sulfur curable elastomer already containing this ingredient which does not detrimentally otherwise affect the polymerization process. In an example, the operating conditions are 150 p.s.i.g. at 45° C., the diluent being formed of n-butane or isobutane and propylene in liquid form. Polymerization is conducted preferably continuously in the reactor while stirring with agitator 2 and the product which is formed as a suspension of small discrete rubbery particles is withdrawn continuously through valve 3, and line 4 to flash chamber 5 maintained at conditions of about 1 p.s.i.g. and 100° C. The flash or separation chamber 5 is preferably lined with a synthetic inert material such as polytetrafluoroethylene ("Teflon") or similar composition. A screw feeder 6 can be provided to introduce solid additives such as stabilizers, while a vibrator 7 can be situated near the bottom of the flash chamber to facilitate withdrawal of the rubbery particles which can be taken directly to an extruder 8, which can be a devolatilizing and compounding apparatus. The flashed diluent which comprises the n-butane or isobutane, unreacted propylene and ethylene can be removed via line 9 to compressor 10, heat exchanger 11 and line 12 directly to reactor 1. A portion of the volatile diluent can be withdrawn through line 13, compressor 14, heater 15 and recycled to the bottom of chamber 5 via line 16. In this manner, adequate heat input can be maintained to cause efficient evaporation in the flash chamber of unreacted monomer(s) and inert diluent. During the polymerization reaction, sufficient propylene monomer is metered in for use both as active monomer component and inert diluent, the amount being sufficient to correspond to between 85 to 1 volume percent of the total diluent system. A typical example for operation in accordance with this process flow diagram is presented hereinafter.

In the process of this invention, the selection of the diluent system is critical. As one component of the diluent system, there is selected a substantially inert aliphatic hydrocarbon boiling between —50° to 37° C. in an amount of from 15 to 99, preferably 15 to 95 and specifically in some systems 15 to 85 volume percent and as the second component, preferably a reactive hydrocarbon in liquid form in a corresponding amount of from 85 to 1, 85 to 5 and 85 to 15 volume percent. Substantially inert hydrocarbons which can be employed are propane, butane, isobutane, isopentane, neopentane, n-pentane and butene-2. A normally gaseous hydrocarbon such as propane, butane, isobutane or neopentane is preferred and it has been found that these hydrocarbons unexpectedly reduce the particle size of the rubber product and greatly reduce reactor fouling when employed in combination with certain monomers in liquid form in the amounts hereinabove stated. Hydrocarbons such as butane and isobutane have some swelling action for the rubber particles, while propylene is a substantial non-solvent for the rubbery materials.

The physical properties such as boiling point and, to some extent, properties such as relative solvent power of the preferred diluents herein correlate to a major extent with the "solubility parameters" of the particular hydrocarbons in point. Solubility parameter is a measure of likeness or compatibility of liquids. Thus, two liquids with similar solubility parameters are, in general, compatible; while two liquids with widely differing solubility parameters are, in general, incompatible and probably immiscible. Solubility parameter for a volatile liquid is an empirical determination and can be determined by the solubility parameter formula $$\sqrt{\frac{\Delta E}{V}}$$

where $\Delta E$ is the molar energy of vaporization in calories to a perfect gas and V is the molar volume in cubic centimeters according to J. H. Hildebrand and R. L. Scott, "The Solubility of Nonelectrolytes," Third Ed., Dover Press, 1964.

The solubility parameters of the hydrocarbon diluents at 25° C. according to this invention are:

Propylene _____ 6.1
Propane _____ 6.2
Isobutane _____ 6.3
Butane _____ 6.6
1-butene _____ 6.7
Neopentane _____ 6.1
Isopentane _____ 6.7
Pentane _____ 7.0
Trans-2-butene _____ 7.0
Cis-2-butene _____ 7.2

The solubility parameters of elastomers is determined differently than for the volatile liquids. Thus, for polymers, the solubility parameters can be obtained from swelling measurements on crosslinked polymers in solvents of varying solubility parameters. An experimental method for such determinations is described by T. J. Dudek and F. Bueche in "Journal of Polymer Science," Part A, vol. 2, pages 811 to 822 (1964).

In general, the solubility parameter of the elastomeric interpolymers is above 7.2, preferably above 7.5 and probably as high as 9 depending on the components of the system. The solubility parameter for an ethylene-propylene rubber containing 53 mole percent ethylene is 7.9, for example.

The selection of a diluent system for a suspension polymerization process as set forth in this specification, as well as certain of the polymerization conditions, are critical in that the diluent system and certain reaction conditions must be capable of producing a particle form interpolymer with minimum reactor fouling. As an example, the use of butane (solubility parameter 6.6) as the sole diluent in an ethylene-propylene interpolymerization results in the formation of a viscous cement and not discrete particle form rubber. However, where the interpolymerization is carried out in combination with propylene (solubility parameter 6.1) in liquid form and at least 15, preferably 20% by volume of said propylene is maintained in liquid form during the entire reaction, then the end result is the production of a particle form elastomer with minimum or no reactor fouling. The reason for these results is not understood, but the operability of the preferred diluent system has nevertheless been established.

In accordance with this invention, the solubility parameters of the diluents should range from 5.0 to 7.0 for preparation of elastomeric products whose solubility parameters range from about 7.5 to 9.0. It is preferred to select two diluents with solubility parameters differing by from 0.1 to 2.0, as such a diluent pair, it has been found, function in a manner to affect important physical properties of the elastomer formed in suspension. To illustrate this point, butane with a solubility parameter of 6.6 (or isobutane 6.3) and propylene with a solubility parameter of 6.1 (difference butane-propylene=0.5 and isobutane-propylene=0.2) form an excellent diluent pair for the polymerization of ethylene-propylene to form a particle type elastomeric interpolymer. The butane or isobutane with their higher solvent power for the elastomer than propylene functions to swell to some extent the elastomer and to precipitate it into small particles as it is formed while propylene as a substantial non-solvent for the elastomer prevents the small particles from dissolving, and the combination of these diluent pairs provides a further surprising result which is minimizing or elimination of reactor fouling. Liquid propylene and butane or isobutane are likewise excellent diluent pairs for the preparation of elastomeric terpolymers where propylene is a component of the elastomer and a multiple unsaturated hydrocarbon is a further component employed to impart unsaturation to the linear elastomeric chain.

Based on the above observation, it was found that for elastomeric systems involving other than propylene as a reactant as well as diluent, that suitable substitution of diluents could be made. Thus, for the elastomeric system ethylene-1-butene or ethylene-butene-multiple unsaturated hydrocarbon terpolymer there can be employed as diluents liquid propane (solubility parameter 6.1) and liquid 1-butene (solubility parameter 6.7) in the preferred amounts hereinbefore noted.

Where the solubility parameter of any liquid monomer, in accordance herewith, is higher than 7.0 for example and such monomer is used as a major component of any interpolymer elastomer, that is, is maintained in substantial amounts in the reaction system during the polymerization, then a further inert liquid component with a lower or intermediate solubility parameter can be employed. Thus, propane and butane or isobutane can be employed in liquid form along with a liquid monomer whose solubility parameter is higher than 7.0, for example. Likewise, in the simple systems ethylene-propylene rubber or ethylene-propylene-multiple unsaturated hydrocarbon interpolymer, some of the propylene diluent can be substituted by propane as the difference between the solubility parameters of these two (6.1 and 6.2, respectively) is near enough to otherwise not affect the ultimate results desired. The substitution is, of course, partial since propylene will still function as a reactive component and diluent except that now, for example, up to 50% of it can be replaced with propane. At any rate, in such a case, the liquid propylene-propane diluent thus comprises in the preferred process herein at least 15, preferably 20% by volume of the total diluent, the remainder being butane.

Where one of the diluent pair which has been selected has a solubility parameter approaching 7, then, of course, the other is preferably selected so that its solubility parameter approaches 6 or lower. It has been found, however, that the preferred inert diluents are those having solubility parameters of from 6.2 to 6.8 which correspond generally to hydrocarbons such as those of the paraffin series having from 3 to 5 carbon atoms and boiling points between about −45° to +30° C. The preferred liquid diluent monomers which of course also enter into the interpolymerization preferably have solubility parameters between 6.0 to 7.0 and these correspond to monomers such as propylene and 1-butene which have boiling points of −47.7 and −6.47° C., respectively. In general, a boiling point range for the monomers is from about −48 to +35° C. Of course, where a liquid monomer boils above, for example, 35° C., then less emphasis is placed on such monomer as a diluent especially if its solubility parameter is 7 or above, that is, it approaches that of the interpolymer being formed. In such a case as hereinbefore pointed out, the diluent can now consist substantially entirely of an inert hydrocarbon in liquid form, such as propane or isobutane and such a diluent or mixture is therefore preferred. Note that throughout this specification where reference is made to a monomer or inert hydrocarbon as a diluent it is intended to be understood that such a diluent is preferably maintained in the volume concentrations hereinbefore noted throughout the polymerization reaction.

In the discussions above concerning the liquid or gaseous monomers and their solubility parameters, emphasis has been placed on those monomers useful in a two component elastomeric system such as ethylene-propylene or ethylene-1-butene with little or no reference to the use of a third monomer to form terpolymers. Since the third monomer in any elastomeric terpolymer system is employed only in minor amounts, that is, in amounts sufficient only to impart unsaturation for sulfur curing (usually in the ranges of from 1% to 15%, preferably 5% to 10%, based on the final product makeup) the solubility parameter of such third monomer does not substantially affect the combined role of the inert diluent and of the monomer in question in achieving the desired results of this invention. Consequently, further comments with respect to third monomer effects will be henceforth limited.

The process of this invention is applicable to the interpolymerization of two or more olefinically unsaturated hydrocarbon monomers to form linear elastomers. Exemplary of interpolymers are two component rubbery elastomers prepared from alpha-olefins of the formula $CH_2=CHR$ where R is selected from the group consisting of H and an alkyl radical of from 1 to 8 carbon atoms. Typical rubbery copolymers which can be formed are ethylene-propylene, ethylene-butene and ethylene-1-hexene. For the ethylene-propylene elastomer it is preferred that the copolymer contain from 20 to 70 mole percent propylene, preferably 25 to 60 mole percent. The particular mole percentages of two, three or four component elastomeric products are not described in any great detail herein as these are well illustrated in the prior art. Interpolymers of alpha-olefins and multiple unsaturated hydrocarbons can likewise be polymerized in accordance with the process herein, such, for example, as ethylene or propylene and higher alpha-olefins containing up to 10 carbon atoms with diolefins such as 1,4-pentadiene, 1,5-hexadiene, 2-methyl-1, 5-hexadiene; or ethylene or propylene and higher alpha-olefins with each other or with branched chain olefins such as 4-methyl-1-pentene 5-methyl-1-nonene; 4-methyl-1-hexene and 6-methyl-1-heptene.

Interpolymers containing at least three unsaturated hydrocarbon monomers can likewise be prepared according to the process herein. In the instance of interpolymers of the type described herein, a third compound which is an acetylenic hydrocarbon such as acetylene itself or a multiple unsaturated hydrocarbon monomer such as dicyclopentadiene can be incorporated in appropriate amounts to impart unsaturation to the rubbery elastomer as is known in the art. Typical of the third component hydrocarbon monomers are the following:

(a) Monocyclic diolefins such as (i) cis, cis-1,5-cyclooctadiene 1,4-cycloheptadiene.

(b) Polyalkenylcycloalkanes such as (i) trans-1,2-divinylcyclobutane 1,2,4-trivinylcyclohexane.

(c) Bicyclic dienes such as (i) bicyclo [4.3.0] 3,7-nonadiene, bicyclo [4.2.0] 2,7-octadiene, bicyclo [3.2.0] 2,6-heptadiene.

(d) 2-alkylnorbornadienes having about 8–24 carbon atoms such as (i) 2-methylnorbornadiene, 2-ethylnorbornadiene, 2-proplynorbornadiene and, in general, those norbornadienes in which the alkyl group contains from 1–17 carbon atoms (see U.S. Pat. 3,063,973) and (e) 5-alkenyl-2-norbornenes such as (i) 5-(1'-butenyl)-2-norbornene; 5-(1' propenyl)-2-norborene; 5-(2'-butenyl) - 2-norbornene; 5-(2'-ethyl-2'-butenyl)-2-norbornene and 5 - (2'-heptyl-1'-undecenyl)-2-norbornene, etc., and 5-methylene-2-norbornene.

Ternary interpolymers of ethylene and propylene or ethylene-1-butene in ratios of 3:1 and 1:3 and (i) another alpha-olefin of the formula $CH_2=CHR$ where R is an alkyl radical containing from 2–8 carbon atoms and is present in an amount of 2 to 20 mole percent of the interpolymer; (ii) aliphatic non-conjugated dienes having the structure

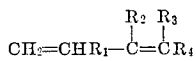

wherein $R_1$ is an alkylene radical, $R_2$, $R_3$ and $R_4$ are selected from the group consisting of H and alkyl, and $R_1$ to $R_4$ are selected so that the diene has from 6 to 22 carbon atoms (see U.S. Pat. 3,166,517); e.g. 1,4-hexadiene, 1,6 - octadiene, 1,5 - hexadiene (see U.S. Pat. 2,933,480), etc.

In general, the process of this invention is applicable to the preparation of two, three, four or more component elastomers, that is, any of the known elastomeric compositions known to the art. Since this invention is concerned with the process of preparing these compositions and not with novel compositions per se, detail concerning such is known to those skilled in the art.

Any of the well-known catalysts for preparing amorphous linear interpolymers known to the art can be employed in the process herein. Such catalysts include the titanium halides such as titanium tetrachloride activated with metallic organic reducing compounds such as trialkylaluminum compounds, alkylaluminum halides and hydrides. Suitable catalysts for the process herein are the vanadium compounds such as $VOCl_3$, $VCl_4$ and vanadium triacetylacetonate, alkylchlorovanadates, trialkylvanadates such as triethyl vanadate, tri-ni-propyl vanadate and, in general, any of the catalysts well known in this art including mixtures of these and including adjuvants thereto or additives such as amines. Catalyst concentrations required to carry out any polymerization are necessarily those which are sufficient for initiation purposes and sufficient to perform such economically, suitable examples being offered hereinbelow.

Molecular weight control or desired molecular weight distribution of the product can be effected by varying catalyst component mole ratios or by the use of hydrogen or any other known means to the art.

The polymerization conditions in accordance with the process herein can be varied considerably from those of the prior art. For example, a wider range of polymerization temperatures can be used since heat transfer is not a problem in this process as compared to heat transfer during polymerization and processing of a viscous cement.

The polymerization conditions such as pressures and/or temperatures should be sufficient to maintain the aliphatic hydrocarbons of from 3 to 5 carbon atoms in liquid form, as well as the monomeric propylene or higher olefin used (those having a boiling point between -48 to 35° C.). In general, pressures of from above 0 to 1000 p.s.i.g. or higher can be used depending also, of course, on the polymerization temperature. The temperature of polymerization need not be as low as in prior art solution polymerization techniques and since vanadium catalysts are now available which are capable of operating efficiently at temperatures of up to 60° C., such higher temperatures can be used with these catalysts. Higher temperatures can, in general, be used with titanium catalysts.

In the process of this invention, the mono-olefins comprise a major proportion of the reactants which preferably range from 85 to 95 percent by weight, the remainder consisting of a third monomer when terpolymers are prepared. Generally, the mono-olefins are incorporated in equimolecular proportions, but variations are permissible as long as an amorphous elastomeric product is the result of such a polymerization.

The elastomers formed from only two alpha-olefins as is known in the art can be crosslinked with peroxides or with peroxides plus sulfur and the resulting vulcanizates have excellent elongation and tensile strength.

The elastomers prepared according to the process of this invention containing olefinic unsaturation have vulcanizing properties similar to those of natural rubber. The olefinic unsaturation of these interpolymers is expressed by an "iodine" number (grams of iodine absorbed per 100 grams of rubber) which is an indication of adequate curability and can range from at least 3 to not more than 50, preferably 5 to 20 (determined according to the method desribed by T. S. Lee, I. M. Kolthoff and Ethel Johnson, "Analytical Chemistry," vol. 22, pages 995 to 1001 (1950)). These interpolymers have intrinsic viscosities (defined and determined according to ASTM D–1601–61) in Decalin at 135° C. of between 0.5 and 7.0 and contain from about 1 to 40, preferably 1 to 15 mole percent of a multiple unsaturated hydrocarbon interpolymerized usually with an alpha-olefin pair such as ethylene and propylene.

The Mooney viscosity of the products of the process of this invention can range from 20 to 150, preferably 30 to 90, as determined with a Mooney viscometer at 212° F. (ML–4) in accordance with ASTM D–927–55T.

The following examples illustrate this invention with more particularity.

EXAMPLE 1

Preparation of ethylene-propylene-dicyclopentadiene terpolymer by solution polymerization in n-heptane This example illustrates the preparation of an amorphous ethylene-propylene dicyclopentadiene terpolymer by a conventional solution polymerization in n-heptane.

A 1.5 liter stainless steel stirred autoclave was charged, under an argon atmosphere, with 600 ml. of dry n-heptane, 200 ml. of liquid propylene, 8.6 g. of ethylene and 1.0 ml. (8.8 millimoles) of ethylaluminum sesquichloride. The reactor was heated to 45° C. and treated over a 21 minute period with 7 ml. of a 0.075 M (0.52 millimoles) solution of $VOCl_3$ in n-heptane and 11 ml. of a 15 volume percent solution of dicyclopentadiene in n-heptane. During the polymerization, the reactor pressure was maintained at 108 p.s.i.g. by the addition of a monomer mixture containing 56 mole percent ethylene and 44 mole percent propylene. The reaction was continued for an additional nine minutes and then 20 ml. of a 5% solution of 2,6-ditertiary butyl-4-methyl phenol ("Ionol") in isopropanol was added to deactivate the catalyst. A clear viscous solution was obtained. The terpolymer was precipitated in a Waring blender with 1 liter of isopropanol containing 2.0 g. of "Ionol." The rubber was washed with the isopropanol-stabilizer mixture and vacuum dried.

| | Grams |
|---|---|
| Yield | 29 |
| Inherent viscosity (Decalin at 135° C.) | 2.9 |
| Percent insoluble in cyclohexane at room temperature | 0.2 |
| Iodine number | 5.1 |

The terpolymer prepared in accordance with this example formed a viscous cement as indicated and the conversion was low.

EXAMPLE 2

Preparation of ethylene-propylene copolymer by suspension polymerization in liquid propylene This example illustrates the preparation of an amorphous ethylene-propylene copolymer by a suspension polymerization in liquid propylene.

A 1.5 liter "Teflon" lined stirred autoclave was charged with 500 ml. of a liquid propylene, 13.4 g. of ethylene and 1.0 ml. (8.8 millimoles) of ethylaluminum sesquichloride. The temperature was set at 25° C. and 4 ml. of 0.036 M. (0.14 millimoles) solution of $VOCl_3$ in n-pentane was added over a 25 minute period while the pressure was maintained between 170–185 p.s.i.g. with the addition of ethylene. The reaction was contained for an additional 7 minutes, after which 500 ml. of isopropanol was added. The product consisted of large rubbery beads. However, a thick layer of rubber was attached to the "Teflon" coating. The product was washed with an Ionol-isopropanol mixture (2.0 g. Ionol/1) and vacuum dried.

|  | Grams |
|---|---|
| Yield | 32 |
| Inherent viscosity (Decalin at 135° C.) | 6.8 |
| Percent insoluble in cyclohexane at room temperature | 0 |

EXAMPLE 3

Preparation of ethylene-propylene copolymers by suspension polymerizations in propylene-n-butane mixtures The procedure of Example 2 was followed, except that the monomer feed was a mixture containing 57 mole percent ethylene and 43 mole percent propylene. Unlike Example 2, very little rubber was attached to the "Teflon" coating. The particle size of the suspended rubber decreased with increasing butane concentration. n-Butane was employed as the diluent as indicated below.

|  | 3A | 3B | 3C | 3D |
|---|---|---|---|---|
| Ethylaluminum sesquicholride (millimoles) | 8.8 | 8.8 | 8.8 | 8.8 |
| $VOCl_3$ (millimoles) | 0.30 | 0.15 | 0.26 | 0.53 |
| Initial ethylene charge (grams) | 5.6 | 8.1 | 10.6 | 8.7 |
| Percent propylene in diluent | 25 | 50 | 75 | 50 |
| Reaction temperature (° C.) | 25 | 25 | 25 | 45 |
| Reaction pressure (p.s.i.g.) | 62 | 106 | 130 | 150 |
| Yield (grams) | 41 | 30 | 52 | 32 |
| Inherent viscosity (Decalin at 135° C.) | 6.1 | 6.2 | 5.9 | 3.8 |
| Percent insoluble in cyclohexane at room temperature | 0 | 0 | 0 | 0 |

The recovery of the rubbery beads was much simplified over the technique used in Example 1 in view of the fact that no coagulation step was required.

EXAMPLE 4

Preparation of ethylene-propylene copolymer by suspension polymerization in propylene-isobutane mixtures The procedure of Example 2 was followed with the following changes: The monomer feed was a mixture containing 52 mole percent ethylene and 48 mole percent propylene; the autoclave wall was stainless steel; the $VOCl_3$ was dissolved in isobutane. The rubber particles were smaller in Run 4A (13 volume percent propylene) than in Run 4B (30 volume percent propylene).

|  | 4A | 4B |
|---|---|---|
| Diethylaluminum monochloride (millimoles) | 8.0 | 0 |
| Ethylaluminum sesquichloride (millimoles) | 0 | 8.6 |
| $VOCl_3$ (millimoles) | 3.0 | 1.2 |
| Initial ethylene charge (grams) | 2.9 | 6.9 |
| Volume percent propylene in diluent | 13 | 30 |
| Reaction temperature (° C.) | 30 | 30 |
| Reaction pressure (p.s.i.g.) | 68 | 92 |
| Yield (grams) | 46 | 56 |
| Inherent viscosity (Decalin at 135° C.) | 3.1 | 3.9 |
| Percent insoluble in cyclohexane at room temperature | 1.6 | 0.7 |

In this example it is illustrated that isobutane can be used in amounts above 85 volume percent. Actually, for isobutane and a monomer such as propylene, the volume percent for isobutane which can be employed ranges up to 99 percent, preferably below, however, such as 85 to 95.

EXAMPLE 5

Preparation of ethylene-propylene-dicyclopentadiene terpolymers by suspension polymerization in propylene-n-butane mixtures The procedure of Example 2 was followed, except that dicyclopentadiene was continuously added during the polymerization (as a 20 volume percent solution in n-pentane) and that the monomer feed was a mixture containing 55 mole percent ethylene and 45 mole percent propylene.

|  | 5A | 5B |
|---|---|---|
| Ethylaluminum sesquichloride (millimoles) | 8.8 | 8.8 |
| $VOCl_3$ (millimoles) | 0.90 | 0.90 |
| Initial ethylene charge (grams) | 6.8 | 9.3 |
| Percent propylene in diluent | 30 | 50 |
| Dicyclopentadiene added (grams) | 1.2 | 1.0 |
| Reaction temperature (° C.) | 33 | 36 |
| Reaction pressure (p.s.i.g.) | 77 | 115 |
| Yield (grams) | 46 | 63 |
| Inherent viscosity (Decalin at 135° C.) | 4.5 | 3.7 |
| Percent insoluble in cyclohexane at room temperature | 1.0 | 1.1 |
| Iodine number | 2.5 |  |

EXAMPLE 6

In apparatus such as illustrated in the drawing, the reactor is charged with 500 grams of n-butane, 100 grams of propylene monomer and 5 grams of ethylene and the reaction is thereafter carried out at a temperature of 30° C. with a catalyst composition consisting of 20 moles ethylaluminum sesquichloride per mole of $VOCl_3$. Upon initiation of the reaction n-butane is pumped in at the rate of 1,000 grams per hour, propylene at 200 grams per hour and ethylene at 10 grams per hour, while the catalyst is metered in separately at the above Al/V ratio. Slurry is withdrawn at a rate sufficient to keep the volume of the reactor contents constant. The withdrawn slurry is passed into a low pressure chamber where the solvent is evaporated, thereby leaving substantially dry elastomeric particles. The particles drop into the throat of a devolatilizing extruder where they are mixed with 0.5 parts per hundred of trisnonylphenylphosphite ("Polygard") antioxidant, extruded and baled.

While various illustrative embodiments have been presented above in describing this invention, resort can be had to other modifications which do not depart from the spirit thereof or the scope of the appended claims.

What is claimed is:

1. In a process for preparing a linear synthetic elastomeric interpolymer which comprises interpolymerizing, (A) at least one alpha-olefin monomer of the form $$CH_2=CHR$$

wherein R is H or an alkyl radical having 1 to 8 carbon atoms with (B), an alpha-olefin monomer as defined in (A) but different therefrom, or a non-conjugated diene monomer in the presence of a vanadium catalyst and an organometallic reducing agent at a temperature in the range of 25° C. to 60° C., the improvement which comprises conducting said interpolymerization in suspension in a diluent system comprising (a) 15 to 99 volume percent isobutane and, (b) 1 to 85 volume percent of at least one hydrocarbon which is (i) an alpha-olefin monomer, (ii) an aliphatic hydrocarbon having 3 to 5 carbon atoms, excluding isobutane, or (iii) mixtures of (i) and (ii); whereby reactor fouling is reduced and said elastomeric interpolymer may be recovered in discrete particle form by flashing the diluent system therefrom.

2. The invention according to claim 1 wherein the elastomeric interpolymer is an ethylene-propylene elastomer and the diluent system comprises (a) isobutane and (b) propylene or a mixture of propylene and propane.

3. The invention according to claim 1 wherein the elastomeric interpolymer is a terpolymer of ethylene, propylene and a minor amount of a non-conjugated diene and the diluent system comprises (a) isobutane and (b) propylene or a mixture of propylene and propane.

4. The invention according to claim 1 wherein the diluent system comprises 15 to 95 volume percent (a) and 5 to 85 volume percent (b).

References Cited

UNITED STATES PATENTS

| | | | |
|---|---|---|---|
| 3,211,709 | 10/1965 | Adamek | 260—80.7 |
| 3,326,883 | 6/1967 | Kelly | 260—94.9 |
| 3,291,780 | 12/1966 | Gladding | 260—80.6 |

JOSEPH L. SCHOFER, Primary Examiner

R. S. BENJAMIN, Assistant Examiner

U.S. Cl. X.R.

260—88.2